May 3, 1932.  J. E. McLAUGHLIN  1,856,577

MOLD

Filed April 29, 1929   2 Sheets-Sheet 1

Inventor
John E. McLaughlin
By J. F. Rule
Attorney

May 3, 1932. J. E. McLAUGHLIN 1,856,577
MOLD
Filed April 29, 1929   2 Sheets-Sheet 2

Inventor
John E. McLaughlin
By J. F. Rule
Attorney

Patented May 3, 1932

1,856,577

UNITED STATES PATENT OFFICE

JOHN E. McLAUGHLIN, OF TOLEDO, OHIO, ASSIGNOR TO OWENS-ILLINOIS GLASS COMPANY, OF TOLEDO, OHIO, A CORPORATION OF OHIO

MOLD

Application filed April 29, 1929. Serial No. 358,878.

My invention relates to machines for molding glass articles and particularly to the molds and their mountings. The invention is herein shown as embodied in a type of machine in which the parisons of glass are given a preliminary formation in blank molds, after which the blank molds are opened and the bare blanks while supported in neck molds or rings are enclosed in the finishing molds and blown to their final form.

In machines of the type indicated, each finishing mold ordinarily comprises two separable sections mounted on a pair of mold arms which are pivoted to swing about the same hinge pin for opening and closing the mold. Operating arms or levers are pivoted to the mold arms and are operable to open and close the mold. With such construction difficulty is experienced in maintaining the mold sections in accurate alignment and obtaining a sufficiently perfect closing of the molds to prevent objectionable seams being formed on the finished articles at the meeting lines of the mold sections.

An object of the present invention is to overcome this difficulty by providing a construction which will insure accurate alignment and closing of the mold, giving a smooth, seamless surface to the finished article.

A further object is to lessen the cost of manufacture and upkeep of the molds.

A further object is to provide a construction permitting the mold to be opened wide enough to provide the desired clearance between the mold sections and the suspended parison as the mold swings into position to be closed around the parison.

Other objects of the invention will appear hereinafter.

Figure 1:
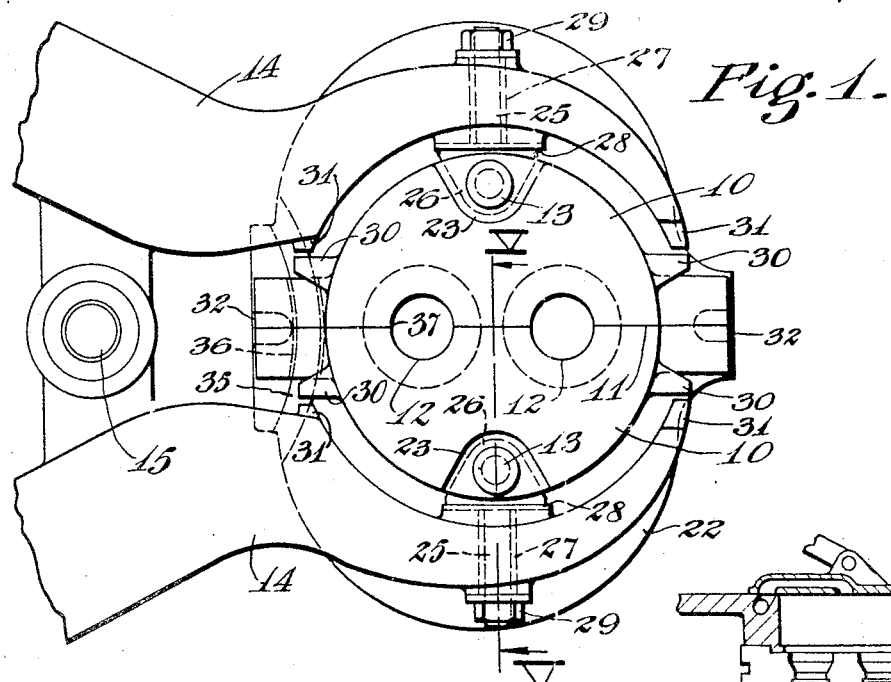
Fig. 1 is a plan view showing a finishing mold and the arms on which it is mounted, the mold being in closed position.
Figure 3:
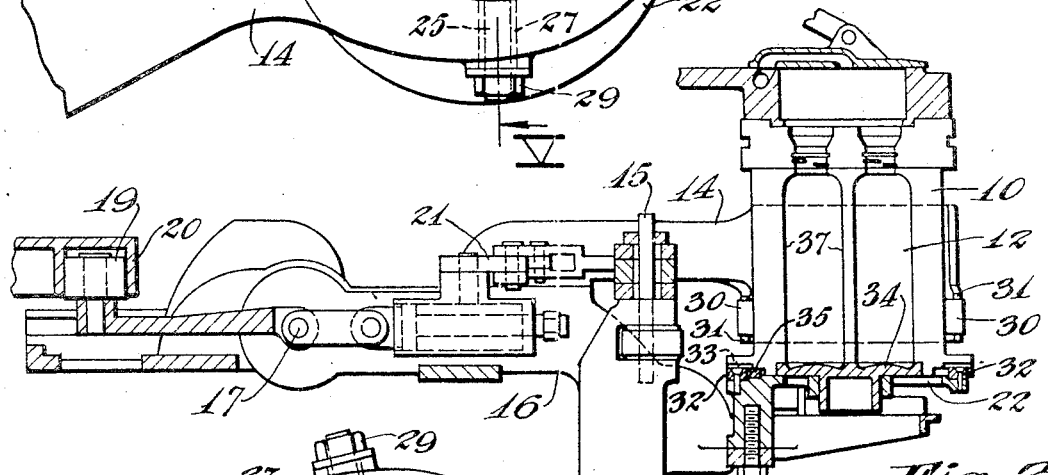
Fig. 3 is a sectional elevation showing a mold carrying frame and a mold thereon.
Figure 2:
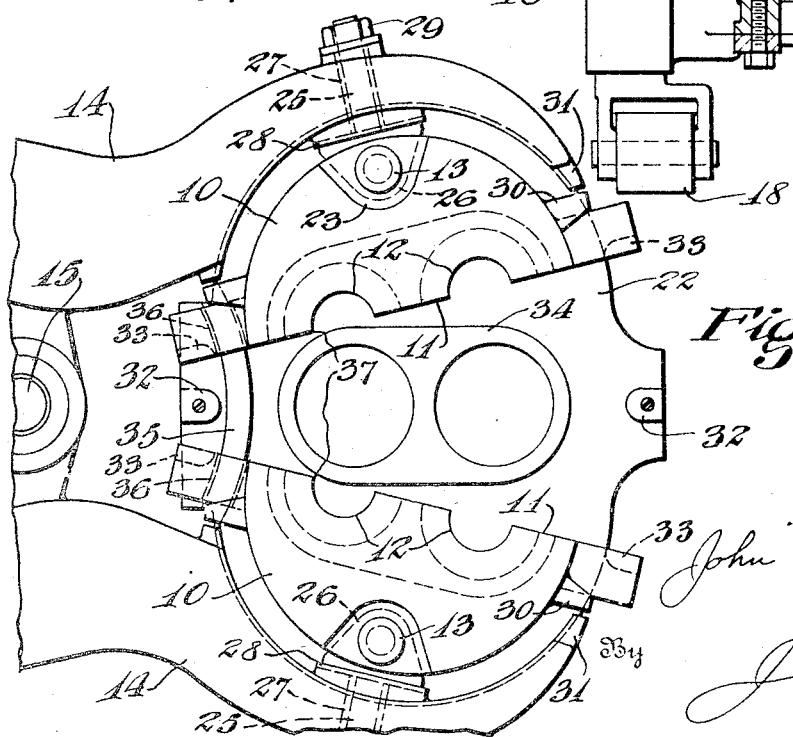
Fig. 2 is a similar view but with the mold open.

The finishing mold 10 comprises horizontally separable sections having their meeting faces 11 in a vertical plane. The mold as herein shown is formed with two mold cavities 12, although the invention can be adapted to molds with a greater or less number of mold cavities. The mold sections are pivotally connected by means of vertical pivot pins 13, to operating arms or levers 14, the latter being connected to swing about a common pivot pin 15. The pin 15 is mounted in a mold carrying frame 16 on which the mold 10 and its operating mechanism are supported. The frame 16 may be of usual construction, as shown, for example, in the patent to LaFrance 1,185,687, June 6, 1916, said frame being mounted on a rotating mold carriage and arranged to swing up and down about an axis 17, under the control of a stationary cam track (not shown) on which runs a roll 18. A cam roll 19 running on a stationary cam track 20 operates thru the usual connections 21 to swing the arms 14 about their pivot for opening and closing the finishing mold.

The mold sections are supported on a horizontally disposed plate 22 on which the lower ends of the molds rest and over which they slide during their opening and closing movements. The plate 22 is mounted on the frame 16.

Figure 4:
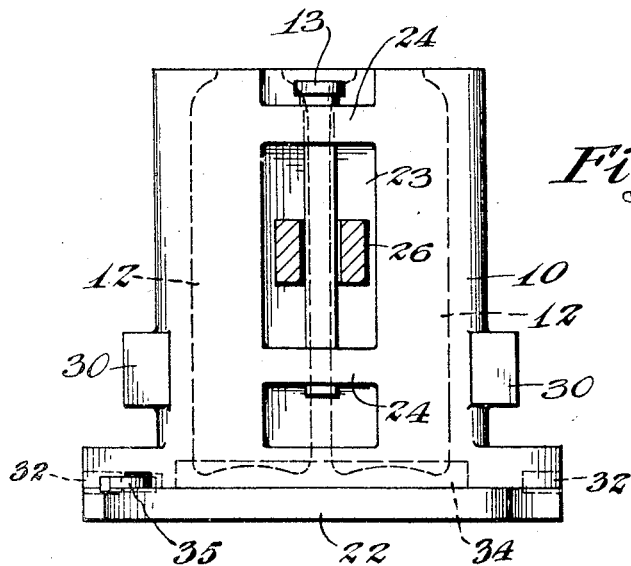
Fig. 4 is an elevation view of a mold section and its supporting plate.
Figure 6:
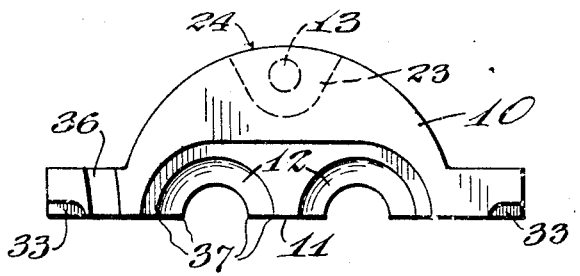
Fig. 6 is a bottom plan view of a mold section.
Figure 5:
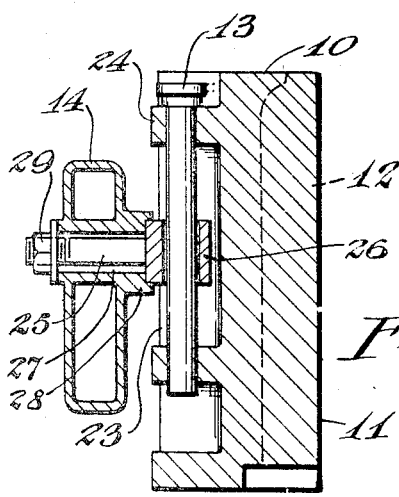
Fig. 5 is a sectional elevation of a mold section at the plane of the line V—V on Fig. 1.

Referring to Figs. 4 and 5, the mold section 10 is formed with a recess 23 in its rear face, and webs 24 extending thereacross are provided with openings to receive the pivot pin 13. A connecting bolt 25 extends horizontally thru the arm 14 and is formed with a head 26 which enters the recess 23 and is provided with a vertical opening thru which the pivot pin 13 extends. The slot 27 thru which the bolt 25 extends is of greater width than the bolt to permit lateral adjustment of the bolt and with it the mold section, in a horizontal direction parallel with the face 11 of the mold section. The arm 14 is provided with shouldered portions 28 projecting over the upper and lower faces of the head 26 for holding said head against up or down movement relative to the arm and guiding it in its adjustments. A nut 29 on the bolt 25 locks the parts in their adjusted position.

The mold sections are permitted a limited horizontal swinging movement about the axes of the pivot pins 13, said movement being limited by stop lugs 30 on the mold sections cooperating with stops 31 on the arms 14. Mold centering lugs 32 are attached to the upper face of the plate 22 and the mold sections are formed on their lower faces with correspondingly shaped recesses 33 providing stop shoulders to engage the stops 32. As the mold sections swing together for closing the mold, the centering lugs 32 engage the mold sections and swing them about their pivots 13 to any extent necessary to bring their meeting faces into proper alignment, that is, in a plane extending thru the vertical axis of the pivot 15. A mold bottom plate 34 may be removably mounted in the bottom supporting plate 22. A guiding rib 35 curved in an arc concentric with the pivot 15 is mounted on the plate 22. The mold sections are formed with recesses 36 in their lower faces to receive said rib, thereby providing means for guiding the mold sections during the opening and closing movements of the mold.

It will be noted that the present construction differs from the usual construction in which the mold sections are carried on mold arms connected to a common pivot pin, and a pair of operating levers are connected to the mold arms. In the present construction in which the mold sections have a pivotal floating connection with the arms 14, the meeting faces of the molds can readily adjust themselves to each other as they are brought together, thus avoiding cracks or open spaces along the edges 37 where the faces of the mold cavities meet the inner flat faces 11 of the molds. This prevents the glass from entering between the faces of the molds and forming the usual unsightly and objectionable seams. The adjustable mounting of the bolts 25 also permits the mold sections to be adjusted so that the mold cavities in the two sections are accurately aligned or registered, thus avoiding any unevenness or defect in the finished article, due to imperfect alignment of the mold cavities. It will also be observed that with the present construction the mold sections as they are moved apart remain more nearly in parallelism than with the usual construction above referred to. This results in a comparatively wide separation of the inner corners of the mold sections, that is, the corners or edges nearest the pivot 15, thus providing ample clearance between the parison and mold faces as the mold sections swing into position to be closed around the parison.

Modifications may be resorted to within the spirit and scope of my invention.

What I claim is:

1. The combination of a mold comprising separable sections formed with mold cavities in their meeting faces, and recesses in their opposite faces, pivot pins extending thru said recesses, mold operating arms, and bearings carried by said arms and extending into said recesses and provided with openings thru which said pivot pins extend, said mold sections being mounted for pivotal movement about the axes of said pivot pins.

2. The combination of a mold comprising horizontally separable sections, a pair of mold operating arms pivoted to swing horizontally, connecting bolts extending horizontally through said arms, and vertical pivot pins providing a pivotal conection between said bolts and the mold sections and permitting pivotal movement of the mold sections about the axes of said pins.

3. The combination of a mold comprising horizontally separable sections, a pair of mold operating arms pivoted to swing horizontally, connecting bolts extending horizontally through said arms, vertical pivot pins providing a pivotal connection between said bolts and the mold sections and permitting pivotal movement of the mold sections about the axes of said pins, and means for adjusting said connecting bolts horizontally in a direction parallel with the meeting faces of the mold sections.

4. The combination of a mold comprising horizontally separable sections, a pair of mold operating arms pivoted to swing horizontally, connecting bolts extending horizontally through said arms, vertical pivot pins providing a pivotal connection between said bolts and the mold sections and permitting pivotal movement of the mold sections about the axes of said pins, a bottom supporting plate on which the mold sections are slidably supported during the opening and closing movements of the mold, and mold centering stops on said plate in position to engage the mold sections as they complete their closing movement and thereby swing them about the axes of said pivot pins to a predetermined position relative to the operating arms.

5. The combination of a pair of mold operating arms pivoted to swing about a vertical axis, a pair of mold sections between said arms, said sections having faces meeting in a vertical plane and formed with recesses therein providing a plurality of vertically disposed mold cavities, said mold sections having vertically disposed recesses in their outer surfaces, connecting bolts extending horizontally through the mold arms and formed with vertical bearing sleeves entering said last mentioned recesses, vertical pivot pins extending through said bearing sleeves and pivotally connecting the mold sections to said arms, and means for individually adjusting said connecting bolts horizontally in a direction parallel with the meeting faces of the mold sections.

Signed at Toledo, Ohio, this 27th day of April, 1929.

JOHN E. McLAUGHLIN.